Nov. 5, 1957  G. F. NADEAU  2,812,279
CEMENTABLE LOW-CURL SHEETING AND METHOD OF MAKING THE SAME
Filed May 7, 1954

GALE F. NADEAU
INVENTOR.

BY

ATTORNEYS

United States Patent Office 2,812,279
Patented Nov. 5, 1957

2,812,279

CEMENTABLE LOW-CURL SHEETING AND METHOD OF MAKING THE SAME

Gale F. Nadeau, Rochester, N. Y., assignor to Eastman Kodak Company, Rochester, N. Y., a corporation of New Jersey Application May 7, 1954, Serial No. 428,369

6 Claims. (Cl. 154—136)

This invention relates to an improved type of sheeting which is quite readily cementable. More particularly, this invention concerns a cementable low-curl sheeting or film consisting essentially of cellulose organic acid ester materials.

For a number of years in the past the sheeting or film used was in many instances comprised of cellulose nitrate or of the acetone-soluble type of cellulose organic esters. Such prior type of sheeting was easily cementable and it was possible to find many cements which would easily produce tack thereon. Also it was otherwise relatively easy to adhere the same or different materials thereto. Consequently, many of the techniques developed as well as the cements and solvents in use were based on the foregoing types of materials. However, in more recent times types of sheeting have come onto the market which are rather difficult, and in some instances almost impossible, to cement or otherwise treat with either the usual cements or solvents or even with special cements and solvents.

It has already been proposed in the art to process the surface of various types of sheets in various manners for rendering the surfaces of the sheets in a receptive condition for various treatments. One suggested type of method is surface hydrolysis. However, with such surface hydrolysis, the results obtained have not been too satisfactory in a number of instances. That is, in surface hydrolysis of sheets or films aqueous or alcoholic caustic solutions may be used. In the instance of cellulose organic ester type of sheeting, there appears to be a deesterification as the hydrolyzing agent moves more deeply into the sheeting structure. The result, therefore, is a surface or thin layer of the hydrolyzed material followed by a very minute zone of intermediate material and then of the main body of sheeting itself. In many instances in surface treated sheeting of this type, complete separation of the surface hydrolyzed portion from the unhydrolyzed material may occur.

Other expedients have been suggested such as applying certain thin layers on the surface of the sheeting. However such prior treatments have either detracted from the over-all strength of the sheeting or undesirable curl in the sheet has developed or other difficulties have been encountered.

It is apparent, therefore, that the development of a new sheeting which is cementable and which has low curl and other advantages represents a highly desirable result.

After extended investigation, I have found a new composite type of sheeting which exhibits improved properties and in several respects the new sheeting of the present invention, while resembling to some extent the sheeting described in Patent 2,559,893, of which I am a joint inventor, represents an improvement thereover as well as over other sheeting or film of the prior art.

This invention has for one object to provide a new composite sheeting which exhibits the desirable properties of being cementable and having a relatively low curl. A particular object of this invention is to provide a cellulose organic ester type of sheeting which is readily cementable and otherwise has desirable properties. A further object is to provide a new composite cellulose acetate type of sheeting having the desirable properties aforesaid. A still further object is to provide a new sheeting of the class indicated which may be prepared from readily available materials either employing existing equipment or with a few adaptations and changes.

Still another object is to provide a new method of cementing sheeting.

Other objects will appear hereinafter.

I have found that a new composite sheeting may be made up in which the inner portion thereof may consist entirely or largely of the material which is difficult to cement. The outer portions or surfaces thereof are comprised of certain materials of a composition and coating thickness which are different than the coatings which hitherto have been used. These outer surfaces may be the same as one another or different from one another. In the preferred embodiment of this invention, as will be apparent as the description proceeds, it will be observed that I prefer to have one of the outer layers of one composition and the other outer layer of a somewhat different composition. By such combination I find that the curl of the finished composite film may be kept to a low value.

In preparing the new composite film of the instant invention, I have found that there appears to be an optimum in the relationship between ease of cementing and the acetyl content or the degree of esterification of cellulose esters generally. I have found further that the outer surfaces of my composite sheeting should in many instances be deposited from a relatively viscous coating composition and also in general in certain instances the outer layer should be of a greater thickness than heretofore has been used in the prior art in coating the outer surfaces of sheets.

In further detail my composite sheeting is made up, for example of a center portion say of a thickness of, for example, .004 to .01 inch. Then there is applied to this center portion outer portions or layers of a thickness of at least .004 inch. It will be observed, therefore, at the onset that the outer layers which go to make up my composite film may be somewhat thicker than the layers which have heretofore been applied to sheeting such as lacquering layers or the like.

For a further understanding of my invention reference may be made to the attached drawing forming a part of the present application. In the attached drawing.

Figure 1:
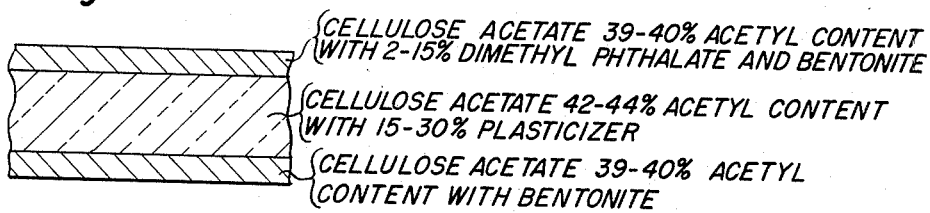
Fig. 1 represents, on an enlarged scale, a cross section of a finished, low curl, cementable, composite sheet in accordance with one species of the present invention.
Figure 2:
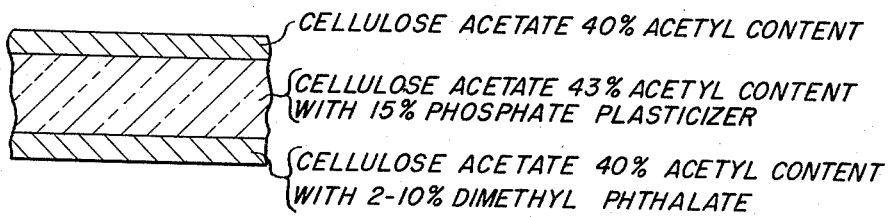
Fig. 2 represents a cross section of another species of composite sheeting in accordance with the present invention. Likewise in this figure, the thickness of the core sheet and the outer layers are shown on a greatly exaggerated scale for the sake of clearness.

The legends appearing on these figures in conjunction with the description herein constitute an adequate explanation of the subject matter depicted in the figures.

In commercial practice, it is possible to make up my new composite film or sheeting by applying the thicker and/or viscous outer coatings by rollers or the like in a manner analogous to the way in which thin coatings have heretofore been applied. That is, the center portion of my composite film may be passed in contact with a roller which applies a layer of suitable thickness to one surface thereof, then into contact with another coating roller which applies the other outside layer of suitable thickness to this other side of the center portion. In using prior art coating procedures and equipment some care must be exercised to be certain that layers of ample thickness are applied to the center portion and this may require certain special considerations, particularly when utilizing a rather viscous outside coating composition which may be employed in the present invention.

One preferred method which I may use in preparing the new composite film of the present invention is as follows:

The center portion of the film is made up by depositing the film-forming material in the usual manner from a hopper spaced close to a coating wheel, onto said coating wheel. The coating wheel is rotated and the temperature thereof controlled to cause the sheet to set up sufficiently thereon so that it may be stripped off before the wheel makes a complete revolution. The freshly stripped center portion of the sheet thus produced is continuously conducted into a drying chamber. This drying chamber contains heated air or the like for removing residual solvent and partially curing the sheet. The partially cured center portion of my composite sheet is then immediately and continuously passed onto another but smaller coating wheel above which wheel there is positioned in close proximity another coating hopper. From this second coating hopper a layer is applied to one of the outer surfaces. The partially prepared composite film thus formed is stripped off from this second wheel or device and subjected to some curing and drying and then immediately and continuously passed over another small wheel so that the remaining uncoated surface is subjected to the application of an outer layer applied from a third coating hoper in combination with this third wheel.

The composite film from the third wheel now comprising the center portion with layers on both sides of the center portion is then conducted through a further drying chamber for curing the film after the finished film is wound up in the usual manner. As may be appreciated from the description of this method, it is advantageous in that it may be a continuous series of operations and the various layers adhere very well to one another because of the partially cured nature of the center portion. Other methods may be used such as extruding the center portion through a die to obtain a sheet after which the sheets pass over second and third rolls, etc., for applying the outer layers as just described.

A further understanding of my invention will be had from a consideration of the following examples which are set forth primarily for illustrating the preferred embodiment.

*Example I*

In accordance with this example, the center portion of about .006 inch thickness of my new composite sheeting was made up of cellulose acetate of an acetyl content between 42-44%. This center portion in addition to the acetate component contained about 15% triphenyl phosphate and about 15% dimethoxyethyl phthalate. The center portion then had applied to one surface thereof a solution of 5% cellulose acetate having approximately 39% acetyl and about 3.5% hydroxyl. This was applied from a liquid comprised of 80% acetone and 15% methanol and which also contained about .01% bentonite based on the total weight of the solution. The application was made by means of conventional roller equipment. After the center portion had a .00075 inch thick coating applied as aforesaid, it was dried by the contact of warm air thereon.

After drying, then the opposite side of the center portion had applied thereto a 5% solution of 39% acetyl type of acetate in 70-75% acetone, 15% methanol and also containing 5 to 10% dimethyl phthalate. Here again the viscous coating was applied by a bead roller to the extent of .00075 inch thickness. After drying this layer in warm air, the finished composite film was rolled up.

The resultant finished sheeting was tested for cementing. This was done by a brush or wick application of methylene Cellosolve acetate to two pieces of the sheeting after which the two pieces were pressed together where the cement had been applied. There was a good initial tack and an excellent keeping bond observed in this test. Further tests were made involving rectangular corner cementing or cylinder cementing on a mandrel which resulted in the production of good bonds.

*Example II*

In accordance with this example the center portion of my new composite sheet was approximately the same thickness, namely about .0065 inch, and of a comparable composition to that described in Example I. In other words, the acetyl content of the cellulose acetate was approximately 43% and the center portion contained about 15% of a phosphate plasticizer. The center portion was formed by depositing the 43% acetyl type of cellulose ester from a coating hopper onto a large coating wheel. This step of sheeting formation was carried out in a generally conventional manner. This center portion of the sheeting thus formed on the large wheel was stripped from the coating wheel before the wheel made a complete revolution. The freshly stripped center portion was then immediately and continuously passed into an air drying chamber where it was partially cured. The partially cured center portion was then immediately brought into contact with a second smaller wheel having a coating hopper positioned over the wheel at approximately the point where the sheeting contacted a substantial portion of the surface of the wheel. From this second coating hopper there was applied a coating made up of cellulose acetate having approximately a 40% acetyl content and a hydroxyl content of about 3%. This was applied from an acetone-methyl alcohol solution. However, a methylene chloride-methyl alcohol solution may be used in many instances. The thickness of this coating was approximately .0005 and was applied from a relatively viscous 5% solution of the 40% acetyl cellulose acetate.

The center portion now coated on one of its outer surfaces with the composition just described was then conducted to and around a third small wheel so that the uncoated other outer surface was exposed to a third coating hopper. From this third coating hopper, there was deposited a 40% acetyl cellulose acetate from solvents of the type as just described. However, this coating in addition to the solvents, contained 2-10% of a dimethyl phthalate plasticizer. By using such a coating from the third hopper, as just described, containing a plasticizer, I found that it is possible to secure a relatively low curl in the finished sheet. I have found that the curl control obtained in this manner can be secured by the use of a lower concentration of plasticizer than would be required to secure the same quality of curl control without the application of an outer or surface layer of the cellulose ester coating such as I used in the present invention.

The film from the third coating wheel was conducted through a drying chamber and finally cured in a conventional manner. Two pieces of the resultant finished sheeting were subjected to cementing tests of the type described in connection with Example I. It was found that this sheeting produced good joints of various kinds. That is, rectangular corner cementing and cylindrical cementing were found to be satisfactory on the new sheeting of this example.

*Example III*

In accordance with this example the center portion of the order of 0.006" was made from cellulose acetate having an acetyl content of 42.5-44% deposited from a solvent mixture comprised essentially of 90 parts methylene chloride and 10 parts methanol. The cellulose acetate contained 15 parts of the weight of the cellulose ester of triphenyl phosphate plasticizer.

The center sheet was coated on both sides with a coating greater than 0.0004", comprised of a 5% solution of 39% acetyl cellulose acetate dissolved in 75% acetone, and 25% methanol.

The finished sheet was cooled and wound up as in the preceding examples.

The finished composite sheeting from this example was tested by sticking, by means of a cement consisting essentially of pure methyl Cellosolve acetate, applied to one edge of a piece of the sheeting and then pressing another piece of the same sheeting thereagainst. The joint was permitted to set for about one second. A good joint was obtained.

The capability of my new sheeting to be cemented in a very short length of time, as is apparent, is important, particularly when such sheeting is used in automatic machinery. With continuously operating machinery it is, of course, highly desirable that there be a minimum of hold up time when the joints of the article being manufactured from the sheeting are setting.

In instances where my sheeting is used to form joints which may be held in clamps for several seconds, there is little or no problem in producing extremely strong joints between my sheeting and itself or various other types of sheeting.

From the preceding examples it will be seen that I have provided a new composite sheeting which is relatively easily cemented to give good quality joints or bonds. While in the above examples I have, in particular, described the use of methyl Cellosolve acetate cements in preparing these bonds, various other cements may be used such as mixtures of acetone and ethyl acetate, dioxane and acetone, and the like.

Likewise in the above examples while I have described depositing the outer layers from solvents comprising acetone, methyl alcohol, methylene chloride and the like, other solvents such as ethylene dichloride and methyl or ethyl alcohol may be used.

The relatively low curl of my sheeting as well as of the sheets joined together as above described is illustrated by the following tests and observations. That is, a test for curl may be made by taking samples across the sheet or coated product, said samples being 1½ x 12" in dimension. These are held in 160° F. oven for two hours with the samples being supported on a muslin tray. After removal from the oven, their curl is measured using an instrument calibrated to give readings equal to 100 divided by the radius of curvature of the arc formed by the sample. Untreated samples of .005" cellulose acetate sheeting product will give readings from 25 to approximately 100 of these units depending upon the age of the sample. Samples treated with proper curl control solutions show curl values from 0 to +.30.

While the above described plasticizers of triphenyl phosphate and dimethyl phthalate are preferred, other plasticizers may be used such as dimethoxy ethyl phthalate alone and in various mixtures with triphenyl or tricresyl phosphates or mixtures of triphenyl phosphate and dibutylphthalate.

Therefore, it can be seen that my new sheeting may be used for various purposes. It is especially useful for fabricating tubes and boxes, the formation of which demands the superior cementing qualities of the sheeting hereinabove described.

I claim:

1. The method of manufacturing a low-curl cementable composite sheeting comprising a central stratum carrying a layer on each surface thereof which comprises preparing said central stratum of cellulose acetate having an acetyl content of about 43% and also containing about 15% plasticizer, applying to one of the outer surfaces of this central stratum a layer of between .0004–.00075 inch thickness of composition consisting of a cellulose acetate of a 39% acetyl content and which contains bentonite, at least partially drying said layer just mentioned, then applying to the other and still uncoated surface of the central stratum a layer of .0004–.00075 inch thick of cellulose acetate having less than 40% acetyl content and also containing 2 to 15% dimethyl phthalate plasticizer, drying this other coating and rolling up said finished composite sheeting.

2. A cementable low-curl composite sheeting of an overall thickness of .005–.015 inch comprised of a core consisting essentially of cellulose acetate having an acetyl content of between 42 and 44%, an outer layer on one surface of the core of a thickness greater than .0005 deposited from a coating solution made up of cellulose acetate of an acetyl content of between 39 and 41% acetyl, and containing a small content of bentonite, and the opposite side of said core being coated with a layer of a thickness greater than .0004 deposited from a coating composition made up of cellulose acetate having an acetyl content between 39 and 41% and also containing 5 to 10% dimethyl phthalate plasticizer.

3. The method of cementing together two cellulose acetate sheets which comprises obtaining two composite sheets of a composition in accordance with claim 2, applying methyl Cellosolve acetate to a portion of the surface of one of said sheets, pressing a portion of one of the composite sheets against the portion of the other sheet to which the methyl Cellosolve acetate has been applied, permitting the solvent to evaporate whereby a strong joint is obtained.

4. The method of manufacturing a low-curl cementable composite sheeting comprising a central stratum carrying a layer on each surface thereof which comprises preparing said central stratum of cellulose acetate having an acetyl content of about 42–44% and also containing 15–30% plasticizer, applying to one of the outer surfaces of this central stratum a layer of between .0004–.00075 inch thickness of composition consisting of a cellulose acetate of a 39–40% acetyl content, at least partially drying said layer just mentioned, then applying to the other and still uncoated surface of the central stratum a layer of .0004–.00075 inch thick of cellulose acetate having 39–40% acetyl content and containing 2 to 15% plasticizer, drying this other coating and rolling up said finished composite sheeting.

5. A cementable low-curl composite sheeting of an overall thickness between about .005 and .015 inch, having a central stratum carrying outer layers on each surface thereof, said central stratum being of a thickness between .004 and .012 and consisting of cellulose acetate having an acetyl content of between 42 and 44% and a content from 15–30% of a plasticizer from the group consisting of diphenyl phosphate and dimethyl phthalate, the outer surfaces of said composite sheeting consisting of layers of a thickness in excess of .0005 of cellulose ester having an acetyl content of 39 to 41%, one of said outer layers containing dimethyl phthalate plasticizer, said outer layers having been applied to the central stratum from a solvent solution containing a solvent from the group consisting of acetone, methylene chloride, and methyl alcohol whereby a strong bond is produced between the central stratum and the outer layers.

6. A cementable low-curl composite sheeting of an overall thickness of .005–.015 inch comprised of a core consisting essentially of cellulose acetate having an acetyl content of between 42 and 44%, an outer layer on one surface of the core of a thickness greater than .0005 deposited from a coating solution made up of cellulose acetate between 39 and 41% acetyl content, and containing a plasticizer, and the opposite side of said core being coated with a layer of a thickness greater than .0004 deposited from a coating composition made up of cellulose acetate having an acetyl content between 39 and 41%.

(References on following page)

References Cited in the file of this patent

UNITED STATES PATENTS

| | | |
|---|---|---|
| 2,036,387 | Babcock et al. | Apr. 7, 1936 |
| 2,094,613 | McBurney et al. | Oct. 5, 1937 |
| 2,129,456 | Wynd et al. | Sept. 6, 1938 |
| 2,339,840 | Daly et al. | Jan. 25, 1944 |
| 2,406,658 | Bogin | Aug. 27, 1946 |
| 2,453,258 | Pearson | Nov. 9, 1948 |
| 2,559,893 | Nadeau et al. | July 10, 1951 |
| 2,740,716 | Forman | Apr. 3, 1956 |

FOREIGN PATENTS

| | | |
|---|---|---|
| 512,967 | Great Britain | Sept. 29, 1939 |